(12) United States Patent
Benner et al.

(10) Patent No.: US 9,969,360 B2
(45) Date of Patent: May 15, 2018

(54) WIPER CONNECTOR AND WIPER ASSEMBLY THEREOF

(71) Applicant: Unipoint Electric Mfg. Co. Ltd., Taipei (TW)

(72) Inventors: Andreas Benner, Taipei (TW); Sam Lai, Taipei (TW); Irving Chiu, Taipei (TW); Hsuhui Huang, Taipei (TW); Chienhung Lai, Taipei (TW)

(73) Assignee: Unipoint Electric Mfg. Co. Ltd., Taipei (TW)

( * ) Notice: Subject to any disclaimer, the term of this patent is extended or adjusted under 35 U.S.C. 154(b) by 606 days.

(21) Appl. No.: 14/547,261

(22) Filed: Nov. 19, 2014

(65) Prior Publication Data

US 2015/0135464 A1    May 21, 2015

(30) Foreign Application Priority Data

Nov. 19, 2013  (CN) .......................... 2013 1 0582510

(51) Int. Cl.
*B60S 1/40* (2006.01)
*B60S 1/38* (2006.01)

(52) U.S. Cl.
CPC ........... *B60S 1/4006* (2013.01); *B60S 1/3849* (2013.01); *B60S 1/4009* (2013.01); *B60S 2001/4022* (2013.01); *B60S 2001/4035* (2013.01); *Y10T 403/591* (2015.01)

(58) Field of Classification Search
CPC .... B60S 1/4006; B60S 1/3849; B60S 1/4009; B60S 2001/4022; B60S 2001/4035; B60S 1/4016; B60S 2001/4058; Y10T 403/59; Y10T 403/591; Y10T 403/595

USPC ........................................................ 15/250.32
See application file for complete search history.

(56) References Cited

U.S. PATENT DOCUMENTS

| | | | |
|---|---|---|---|
| 8,627,539 B2 * | 1/2014 | Lee ........................ | B60S 1/4019 15/250.32 |
| 2007/0220698 A1 * | 9/2007 | Huang ................... | B60S 1/3856 15/250.32 |
| 2012/0090125 A1 * | 4/2012 | Uchiyama ............. | B60S 1/3801 15/250.32 |
| 2012/0110773 A1 * | 5/2012 | Thielen .................. | B60S 1/4003 15/250.32 |

(Continued)

FOREIGN PATENT DOCUMENTS

| FR | 3005017 | * 10/2014 |
|---|---|---|
| JP | 2002-308063 | * 10/2002 |

(Continued)

OTHER PUBLICATIONS

Machine translation of description portion of Japanese publication 2002-308063, published Oct. 2002.*

*Primary Examiner* — Gary Graham
(74) *Attorney, Agent, or Firm* — Michael Best & Friedrich LLP

(57) ABSTRACT

A wiper connector and a wiper assembly thereof. The connector is detachably coupled between a wiper arm and a wiper, wherein the connector comprises a connector body and a stopper. The connector body has a longitudinal groove. One end of a stopper is detachably and rotatably disposed at one end of the longitudinal groove, and the other end of the stopper is detachably retained to the longitudinal groove so that the stopper movably shields a part of an opening of the longitudinal groove.

7 Claims, 4 Drawing Sheets

(56) References Cited

U.S. PATENT DOCUMENTS

2014/0352099 A1 * 12/2014 Fujiwara ................ B60S 1/381
15/250.34

FOREIGN PATENT DOCUMENTS

| JP | 2012-136149 | * | 7/2012 |
| KR | 20060134912 A | * | 12/2006 |
| KR | 1020100049230 | * | 5/2010 |
| KR | 10-1287466 | * | 7/2013 |

* cited by examiner

WIPER CONNECTOR AND WIPER ASSEMBLY THEREOF

BACKGROUND OF THE INVENTION

The present invention relates to the field of a connector for wiper, or wiper connector, and a wiper assembly thereof.

The automobile is currently a common vehicle for social people. In particular, under weather conditions of wind blowing and raining, the automobile can better shield wind and rain than bicycles and motorcycles, in addition to being used instead of walking. The automobile, while traveling in the rain, will mostly use wipers to ensure sight lines and safety of driving. Generally speaking, the wiper comprises a wiper rod, on which a connecting portion cooperates with an adapter so that a wiper arm is connected to the wiper rod. The wiper arm can be driven by a driving component so as to drive the wiper rod connected to the wiper arm, thus enabling the wiper to wipe the windshield. In other words, the vehicle wiper device is typically mounted adjacent to vehicle windshield, and the wiper rod thereof reciprocates in the range of the wiper on the windshield in a swinging manner, whereas the wiper rod is used to remove depositions on the windshield such as dust or water stains, for example, rain or snow pieces adhered to the windshield.

However, most of existing wipers are provided with a movable cover, which must be firstly opened by users when assembling the wiper to the wiper arm so that the wiper arm and the wiper can be connected appropriately or stably. Besides, the cover can also serve to prevent the wiper arm from being detached. However, in order to securely prevent the wiper arm from being detached, some existing covers are arranged to be not easily detached or opened. Alternatively, some other existing covers can achieve the objective of being easily detached or opened by users, but the effect of preventing the wiper arm from being detached is a concern. Therefore, there arise higher requirements on the covers of existing wipers in terms of both securely preventing the wiper arm from being detached and facilitating operations by users.

SUMMARY OF THE INVENTION

The invention provides a wiper connector and a wiper assembly thereof that are secure in retention and have a good detachability, thus assisting connecting the wiper connector to a stopper of a wiper arm firmly and stably. The embodiments to be described below of the invention are directed to a wiper connector and a wiper assembly thereof, which have substantively addressed one or more problems caused by the limitations and deficiencies in the prior art.

One object of the invention is to provide a wiper connector which is detachably coupled between a wiper arm and a wiper, wherein the connector comprises a connector body and a stopper. The connector body has a longitudinal groove. One end of a stopper is detachably and rotatably disposed at one end of the longitudinal groove, and the other end of the stopper is detachably retained to the longitudinal groove. The stopper movably shields a part of an opening of the longitudinal groove.

Preferably, the end of the stopper that is provided to the longitudinal groove may have a pivot portion, and two side walls of the longitudinal groove can have a shaft portion respectively which corresponds to the pivot portion. The stopper is provided to the longitudinal groove in such a way that it is pivotable around the pivot portion and the shaft portions that are pivotably connected to each other.

Preferably, the pivot portion may be of an annular structure that has a notch, the shaft portion may be a convex column that projects inwardly from a side wall of the longitudinal groove, and the shaft portion, which is a convex column, is embedded into the pivot portion or removed from the pivot portion from the notch.

Preferably, two sides of the end of the stopper that is retained to the longitudinal groove can be provided with a snapping member respectively, whereas two opposed side walls of the longitudinal groove can be provided with a retaining portion respectively which corresponds to the snapping member, and the snapping member of the stopper is detachably retained to the retaining portion of the longitudinal groove.

Preferably, the snapping member can have an elastic arm and a snapping portion; one end of the elastic arm, which corresponds to the retaining portion, is elastically connected to the side wall of the stopper, and the snapping portion, which corresponds to the retaining portion, is provided at the other end of the elastic arm.

Preferably, the snapping portion can be a groove or a projection, while the retaining portion, which corresponds to the snapping portion, can be a projection or a groove; the snapping portion or the retaining portion, which is a projection, has a guide surface and an abutment portion; the guide surface abuts against the elastic arm or side wall of the longitudinal groove so that the elastic arm is elastically deformed, thus enabling the abutment portion to detachably abut against sidewall of the retaining portion or the snapping portion, which is a groove.

Preferably, the other end of the elastic arm can be provided with a force applying portion which projects in a direction from the inside to the lateral side, and the connector body can be provided with a receiving groove which corresponds to the force applying portion on a side face of the opening of the longitudinal groove for receiving the force applying portion.

Preferably, the stopper is set in correspondence to the shape of the side face of the opening of the longitudinal groove of the connector body and the shape of the opening of the longitudinal groove. When the stopper is received in the longitudinal groove, the stopper abuts the side face of the opening of the longitudinal groove of the connector body, and the periphery edge of the stopper abuts an end of a wiper arm adapter which fits in the longitudinal groove.

Preferably, when a wiper arm adapter which fits in the longitudinal groove is rotated to be displaced, the other end of the stopper abuts an end of the wiper arm adapter which fits in the longitudinal groove so as to restrict the degree of freedom of rotation.

Another object of the invention is to provide a wiper assembly which can be used in cooperation with wiper arm and comprises a wiper and the above-described connector that can be detachably coupled between the wiper and the wiper arm.

The invention will be described below with reference to the preferred embodiments so that the technical features of the invention and the technical effects achieved thereby can be further understood and appreciated.

DETAILED DESCRIPTION

The embodiments will be described with more details hereinafter with reference to the accompanying drawings; however, all of these embodiments can be implemented in different forms and should not be considered as being merely limited to these embodiments set forth herein. More specifically, these embodiments are used to make the disclosure more thorough and complete and to fully convey the scope of the invention to those skilled in the art.

Figure 1:
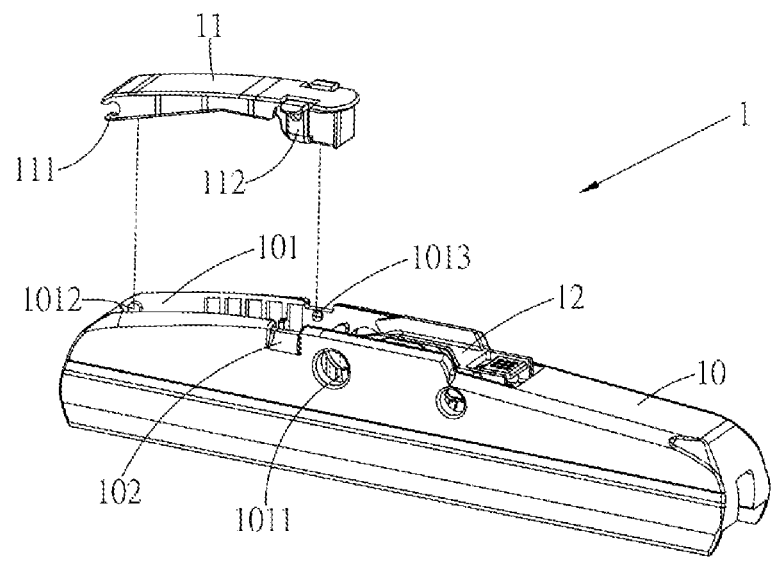
FIG. 1 is an exploded schematic view of the wiper connector according to a first embodiment of the invention.
Figure 2:
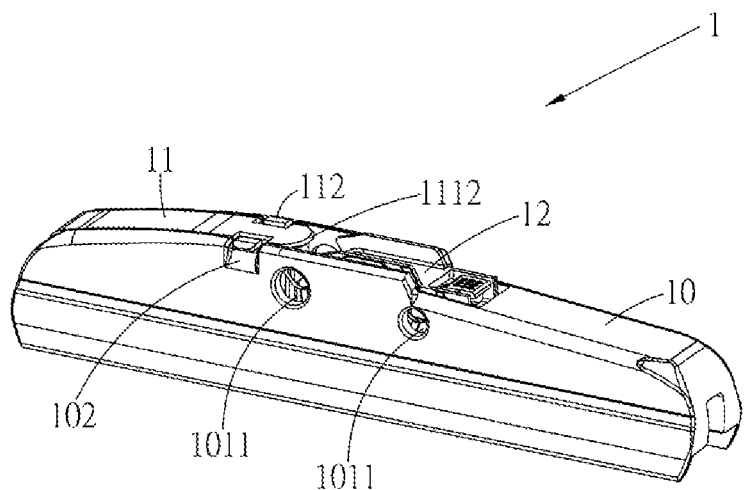
FIG. 2 is a combined schematic view of the wiper connector according to the first embodiment of the invention.
Figure 7:
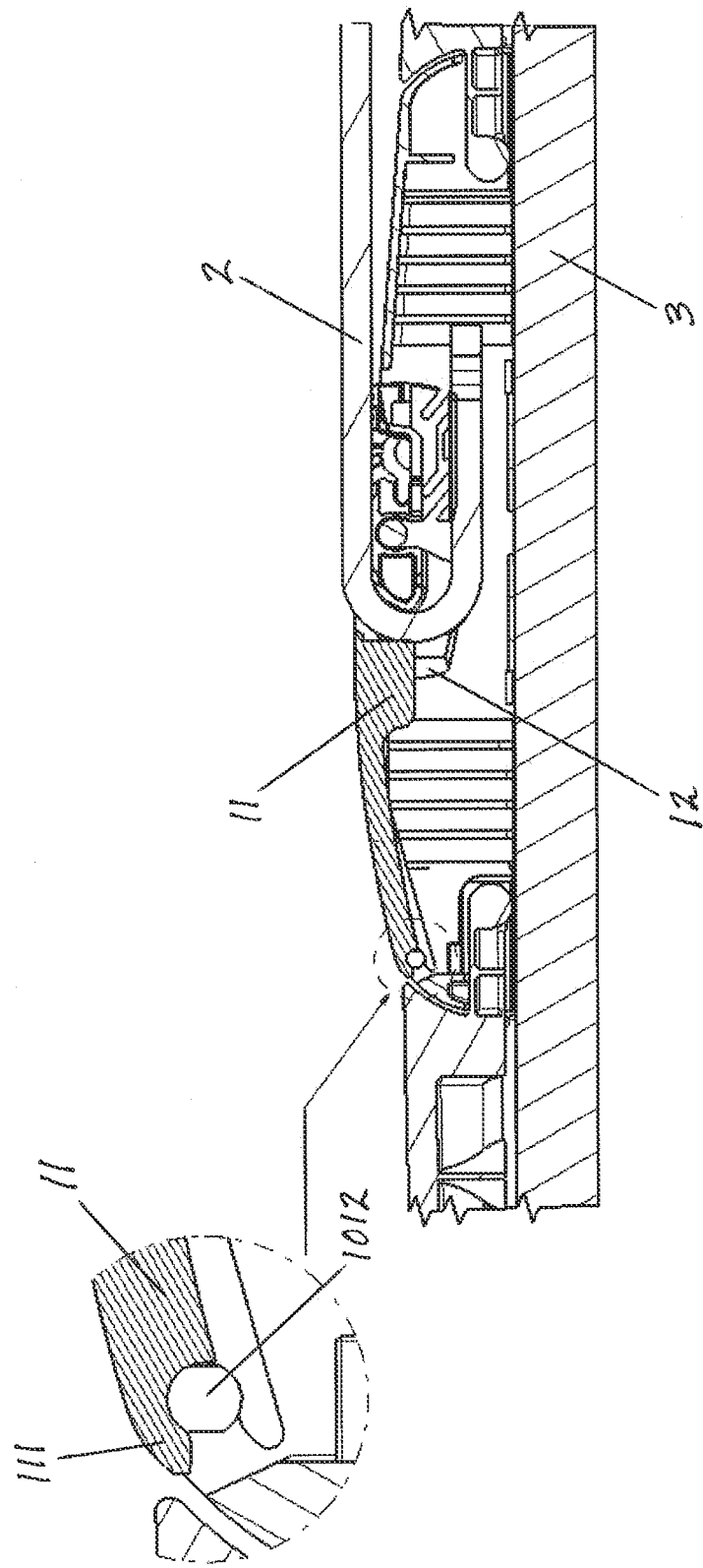
FIG. 7 is a partial schematic sectional view of the wiper connector according to the first embodiment of the invention and showing the wiper arm connected to the wiper connector.

Reference is made to both FIGS. 1 and 2, which are an exploded schematic view and a combined schematic view of the first embodiment of the wiper connector of the invention, respectively. As shown, the connector 1 for wiper is detachably coupled between a wiper arm 2 (partially shown in FIG. 7) and a wiper 3 (partially shown in FIG. 7). The connector 1 comprises a connector body 10 and a stopper 11, wherein the connector body 10 has a longitudinal groove 101 in the longitudinal direction thereof, and the longitudinal groove 101 is provided therein with a pivot hole 1011 and a wiper arm adapter 12. The pivot hole 1011 is coupled to the wiper arm and is disposed transversely, and the wiper arm adapter 12 is also coupled to the wiper arm and can be pivoted in the longitudinal groove 101. As shown in FIG. 7, the wiper arm 2 has a hook-shaped end that engages the adapter 12. The stopper 11 is disposed in the longitudinal groove 101, wherein one end of the stopper 11 (the left end in FIG. 1) is detachably and rotatably disposed at one end of the longitudinal groove 101, and the other end of the stopper 11 (the right end in FIG. 1) is detachably retained in the longitudinal groove 101 so as to be adjacent to be pivot hole 1011. In this way, the stopper partially shields an opening of the longitudinal groove 101 in a moveable manner. When the wiper arm adapter 12 which fits in the longitudinal groove 101 is pivoted to be displaced, the right end of the stopper 11 abuts the end of the wiper arm adapter 12 which fits in the longitudinal groove 101, as shown in FIG. 7, and thereby restricts the degree of freedom of the wiper arm adapter 12 in pivoting displacement. The stopper 11 is also securely retained in the wiper connector 1 so that the right end of the stopper abuts the end of the wiper arm 2, as shown in FIG. 7, and thereby securely prevents the wiper arm from being detached.

The left end of the stopper 11 which is disposed in the longitudinal groove 101 in a pivoting manner has a pivot portion 111, and two side walls of the longitudinal groove 101 have a shaft portion 1012 respectively, which corresponds to the pivot portion 111. That is, the stopper 11 is assembled to the shaft portion 1012 through the pivot portion 111 so that the stopper 11 rotates around a joint of the pivot portion 111 and the shaft portion 1012 so as to be pivotably disposed in the longitudinal groove 101. The pivot portion 111 and the shaft portion 1012 will be described later with details (as shown in FIG. 3).

On the other hand, the stopper 11 is retained in the longitudinal groove 101, and two sides at the right end of the stopper 11 are provided with a snapping member 112 respectively, whereas two opposed side walls of the longitudinal groove 101 are provided with a retaining portion 1013 respectively, which corresponds to the snapper member 112. The right end of the stopper 11 can be retained to or detached from the retaining portion 1013 through the snapping member 112 so as to be detachably retained in the longitudinal groove 101. The snapping member 112 and the retaining portion 1013 will be described later with details (as shown in FIG. 4).

Figure 3:
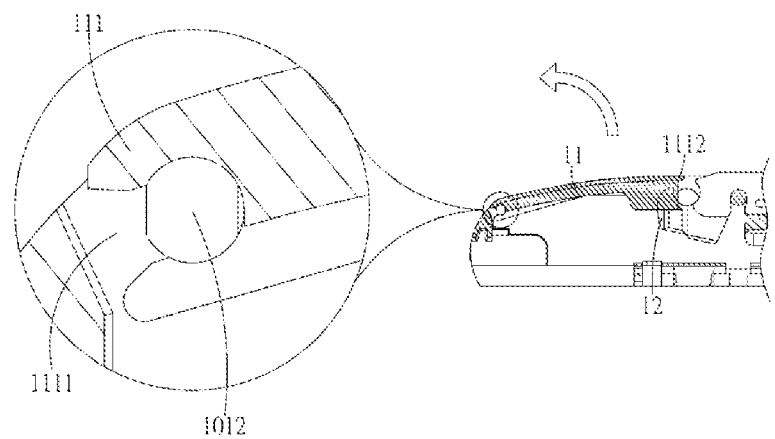
FIG. 3 is a first partial schematic sectional view of the wiper connector according to the first embodiment of the invention.

Reference is further made to FIG. 3, which is a first partial schematic sectional view of the first embodiment of the wiper connector according to the invention. FIG. 3 mainly serves to illustrate a joint of the pivot portion 111 and the shaft portion 1012 and the way of pivotably connecting them. As shown, with respect to the pivot portion 111 and the shaft portion 1012, specifically, the pivot portion 111 can be of an annular structure having a notch 1111, for example, a C-shaped structure, whereas the shaft portion 1012, corresponding to the pivot portion 111, can be a convex column that projects towards the inside of the longitudinal groove 101 from a side wall of the longitudinal groove 101 (i.e., in a direction transverse to the connector body 10). When the pivot portion 111 of the stopper 11 is to be assembled or pivotably connected to the shaft portion 1012, the shaft portion 1012 can be embedded into the pivot portion 111 having a C-shaped structure through the notch 1111. That is, when the shaft portion 1012, which is a convex column, abuts the notch 1111, it will make the pivot portion 111 deform elastically so that the size of the notch 111 will temporarily be enlarged due to the abutment with the shaft portion 1012 and therefore the shaft portion 1012 may enter into the pivot portion 111. At this time, since the force that abuts the notch 1111 is released, the size of the notch 1111 will return to the original size by elastic force so that the pivot portion 111 and the shaft portion 1012 will be combined appropriately. On the contrary, when the pivot portion 111 is to be detached from the shaft portion 1012, the above-described process can be performed in a reverse manner. Incidentally, those skilled in the art can exchange the pivot portion 111 and the shaft portion 1012 with each other without departing from the spirit and scope of the invention, and the equivalent modifications or variations made to the invention should all be covered by the appended claims.

It is worth noting that the stopper 11 can be set corresponding to the shape of the side face of the opening of the longitudinal groove 101 of the connector body 10 (as shown in FIG. 3) and the shape of the opening of the longitudinal groove 101 (as shown in FIG. 2). That is, when the stopper 11 is received in the longitudinal groove 101, the stopper 11 can appropriately abut the side face of the opening of the longitudinal groove 101 of the connector body 10 without obviously protruding out of the connector body 10, thus providing a well-defined good consistency when viewed as a whole. In addition, the periphery edge of the stopper 11 which is adjacent to the other end of the wiper arm adapter 12 restricts the degree of freedom of the wiper arm adapter 12 in pivoting displacement. By way of example, the stopper 11 may have a projecting periphery edge 1112. When the wiper arm adapter 12 rotates to a certain degree, an end of the wiper arm adapter 12 will abut the periphery edge 1112 of the stopper 11 so as to restrict the degree of freedom of the wiper arm adapter 12 in pivoting displacement.

Figure 4:
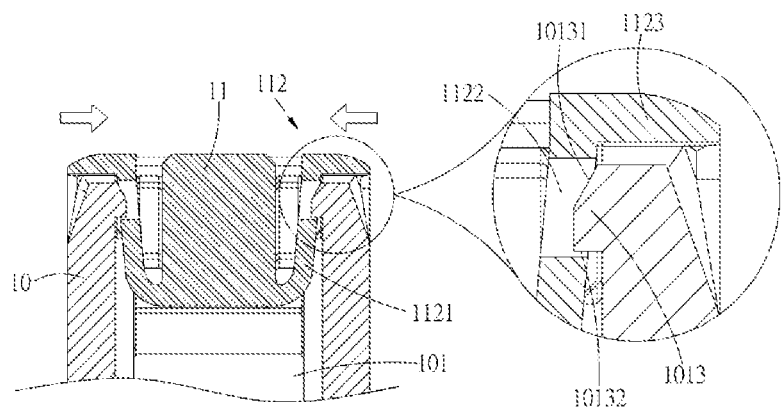
FIG. 4 is a second partial schematic sectional view of the wiper connector according to the first embodiment of the invention.

Reference is further made to FIG. 4, which is a second partial schematic sectional view of the wiper connector according to the first embodiment of the invention. FIG. 4 mainly serves to illustrate how the snapping member 112 is retained to the retaining portion 1013. As shown, with respect to the snapping member 112 and the retaining portion 1013, specifically, the snapping member 112 may have an elastic arm 1121 that is elastically deformable and a snapping portion 1122 used for being snapped onto the retaining portion 1013. Wherein, one end of the elastic arm 1121, corresponding to the retaining portion 1013, is connected to a side wall of the stopper 11, and corresponding to the retaining portion 1013, there is provided with the snapping portion 1122 adjacent to the other end of the elastic arm 1121. The direction of the longer edge of the elastic arm 1121 is approximately parallel to the side wall of the stopper 11, and the end of the elastic arm 1121 that is connected to the stopper 11 can be turned into an arc structure so as to be connected to the side wall of the stopper 11. The position of the snapping portion 1122 is set in correspondence to the position of the retaining portion 1013, which also means that the position of the retaining portion 1013 is set in correspondence to the position of the snapping portion 1122.

In particular, it is noted that the snapping portion 1122 can be of a groove structure, while the retaining portion 1013, corresponding to the snapping portion 1122, can be of a projection structure which has a guide surface 10131 and an abutment portion 10132. Wherein the guide surface 10131 is an inclined surface which faces the opening of the longitudinal groove 101, and the abutment portion 10132 is provided on the other side face which is opposed to the guide surface 10131. Since the distance between two outside faces of the two elastic arms 1121 on the two sides of the stopper 11 can be set just equal to or slightly smaller than the size of the opening in the transverse direction of the longitudinal groove 101, when the snapping member 112 of the stopper 11 is to be retained to the retaining portion 1013 so as to enter into the longitudinal groove 101, the abutment at the guide surface 10131 will make the elastic arm 1121 elastically deform at the arc structure. Then, the snapping member 112 can appropriately enter into the longitudinal groove 101, and when the snapping member 112 appropriately enters the longitudinal groove 101 up to an appropriate degree or a predetermined degree (e.g., when the stopper 11 abuts the side face of the opening of the longitudinal groove 101 of the connector body 10), the retaining portion 1013, which a projection, is embedded into the snapping portion 1122, which a groove. At this time, since the abutting force at the guide surface 1031 is released, the elastic arm 1121 will return to the original state. Meanwhile, the abutment portion 10132 abuts a bottom wall of the snapping portion 1122, which a groove, so as to prevent the snapping portion 1122 from being detached. Thus, the snapping member 112 can be appropriately and securely retained to the retaining portion 1013.

In addition, when the snapping member 112 is to be removed from the retaining portion 1013, the elastic arm 1121 can be pulled so that the elastic arm 1121 deforms and the snapping portion 1122 is detached from the retaining portion 1013, thus smoothly removing the snapping portion 1122 from the retaining portion 1013. In a preferred embodiment, i.e., an example of the present embodiment, the other end of the elastic arm 1121 can be provided with a force applying portion 1123 which projects in a direction from the inside to the lateral side. The arrangement of the force applying portion 1123 facilitates relevant people or users to deform the elastic arm so that the snapping portion 1122 is detached from the retaining portion 1013. Incidentally, in correspondence with the arrangement of the force applying portion 1123, a receiving groove 102 for receiving the force applying portion 1123 and corresponding to the force applying portion 1123 can be provided on a side face of the opening of the longitudinal groove 101 of the connector body 10. With such a structure, the stopper 11 will not obviously protrude out of the connector body 10, thus keeping a consistency in appearance.

Figure 5:
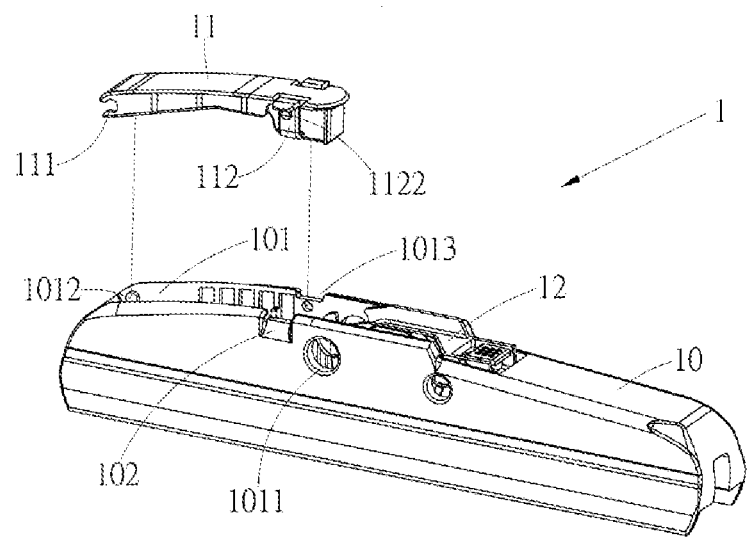
FIG. 5 is an exploded schematic view of the wiper connector according to a second embodiment of the invention.

Reference is made to FIG. 5, which is an exploded schematic view of the wiper connector according to a second embodiment of the invention. The main construction of this embodiment of similar to that of the previous embodiment. Therefore, the connecting and acting relationship between identical or similar assemblies will not be described repeatedly. This embodiment differs from the previous embodiment mainly in that in this embodiment, the snapping portion 1122 is configured as a projection, while the retaining portion 1013 is configured as a groove.

Figure 6:
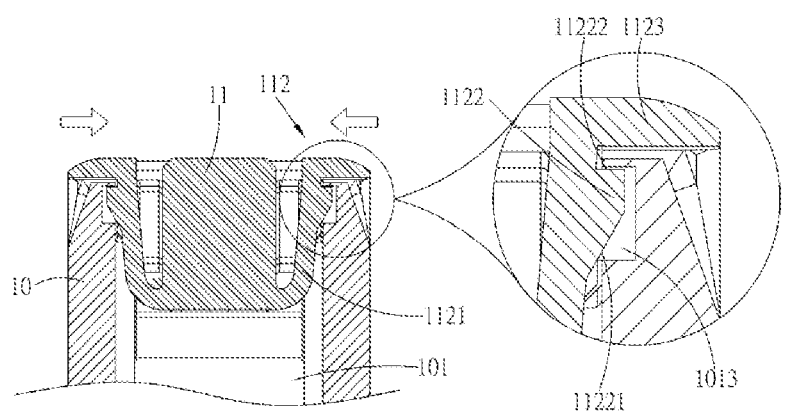
FIG. 6 is a partial schematic sectional view of the wiper connector according to the second embodiment of the invention.

Reference is further made to FIG. 6, which is a partial schematic sectional view of the wiper connector according to the second embodiment of the invention. Specifically, the snapping member 112 can have an elastic arm 1121 and a snapping portion 1122, wherein the snapping portion 1122 is configured as a projection and is provided with a guide surface 11221 and an abutment portion 11222. At this time, the guide surface 11221 provided in the snapping portion 1122 is an inclined surface which faces the opening of the longitudinal groove 102, while the abutment portion 11222 is provided on the other side face which is opposed to the guide surface 11221. On the other hand, the retaining portion 1013 is configured as a groove in correspondence with the snapping portion 1122, which is a projection. Therefore, when the snapping member 112 of the stopper 11 enters into the longitudinal groove 101, the abutment of the guide surface 11221 of the snapping portion 1122 at the side wall of the longitudinal groove 101 will make the elastic arm 1121 elastically deform at the arc structure. Then, the snapping member 112 can appropriately enter into the longitudinal groove 101, and when the snapping member 112 appropriately enters the longitudinal groove 101 up to an appropriate degree or a predetermined degree, the snapping portion 1122, which a projection, is embedded into the retaining portion 1013, which a groove. At this time, since the abutting force at the guide surface 11221 of the snapping portion 1122 is released, the elastic arm 1121 will return to the original state. Meanwhile, the abutment portion 11222 of the snapping portion 1122 abuts an upper top wall of the retaining portion 1013, which a groove, so as to restrict or prevent the snapping member 112 from being detached from the retaining portion 1013. Thus, the snapping member 112 can be appropriately and securely retained to the retaining portion 1013.

In addition, the invention further provides a wiper assembly which can be used in cooperation with wiper arm and comprises a wiper and the above-described connector that can be detachably coupled between the wiper and the wiper arm.

As compared to the prior art, this wiper connector has a good applicability. The wiper connector is configured appropriately by a pivot portion and a shaft portion so that the stopper can be securely retained to the wiper connector so as to be rotatable. Besides, with an appropriate configuration of the snapping member and the retaining portion, the stopper can be securely retained to the wiper connector so as to securely prevent the wiper arm from being detached. Moreover, with the arrangement of the elastic arm and the force applying portion, operations by users or relevant people are facilitated. Therefore, both the operations of assembling and disassembling are rather convenient. Furthermore, when the stopper is provided on the wiper connector from above, the stopper can suitably fit the wiper connector so as to suitably abut the wiper connector. Therefore, a well-defined good consistency and appearance when viewed as a whole is also provided.

The above description is merely illustrative rather than limiting. Any equivalent modifications or variations to the invention made without departing from the spirit and scope of the invention should be covered by the appended claims.

NOTES OF REFERENCE SIGNS 1 wiper connector
10 connector body
101 longitudinal groove
1011 pivot hole
1012 shaft portion
1013 retaining portion
10131 guide surface
10132 abutment portion
102 receiving groove
11 stopper
111 pivot portion
1111 notch
1112 edge
112 snapping member
1121 elastic arm
1122 snapping portion
11221 guiding surface
11222 abutment portion
1123 force applying portion
12 wiper arm adapter

What is claimed is:

1. A wiper connector configured to be detachably coupled between a wiper arm and a wiper, the wiper connector comprising:
    a connector body having a longitudinal groove; and
    a stopper having a first end detachably and rotatably disposed at one end of the longitudinal groove, and the stopper having a second end detachably retained in the longitudinal groove, wherein the stopper movably shields a part of an opening of the longitudinal groove;
    wherein two sides of the second end of the stopper are each provided with a snapping member respectively, and two opposed side walls of the longitudinal groove are each provided with a retaining portion respectively which corresponds to one of the snapping members, wherein each snapping member is detachably retained by one of the retaining portions of the longitudinal groove;
    wherein each snapping member has an elastic arm and a snapping portion, wherein one end of each elastic arm is elastically connected to a side wall of the stopper, and each snapping portion is provided at another end of the elastic arm;
    wherein the other end of each elastic arm is also provided with a force applying portion which projects in a direction from an inside to a lateral side, and the connector body is provided with receiving grooves which correspond to the force applying portions on side faces of the opening of the longitudinal groove for receiving the force applying portions.

2. The wiper connector according to claim 1, characterized in that the first end of the stopper has a pivot portion, and two side walls of the longitudinal groove have a shaft portion respectively which corresponds to the pivot portion, wherein the stopper is disposed in the longitudinal groove in such a way that the stopper is pivotable around the pivot portion and the shaft portions that are pivotably connected to each other.

3. The wiper connector according to claim 2, characterized in that the pivot portion is of an annular structure that has a notch, the shaft portion is a convex column that projects inwardly from a side wall of the longitudinal groove, and the shaft portion is inserted into the pivot portion or removed from the pivot portion from the notch.

4. The wiper connector according to claim 1, characterized in that the snapping portion is a groove or a projection, while the retaining portion, which corresponds to the snapping portion, is a projection or a groove; the snapping portion or the retaining portion, which is a projection, has a guide surface and an abutment portion; the guide surface abuts against the elastic arm or side wall of the longitudinal groove so that the elastic arm is elastically deformed, thus enabling the abutment portion to detachably abut against a side wall of the retaining portion or the snapping portion, which is a groove.

5. The wiper connector according to claim 1, characterized in that the stopper is set in correspondence to a shape of a side face of the opening of the longitudinal groove and a shape of the opening of the longitudinal groove; when the stopper is received in the longitudinal groove, the stopper abuts the side face of the opening of the longitudinal groove, and a periphery edge of the stopper abuts an end of a wiper arm adapter which fits in the longitudinal groove.

6. The wiper connector according to claim 1, characterized in that when a wiper arm adapter which fits in the longitudinal groove is rotated to be displaced, the second end of the stopper abuts an end of the wiper arm adapter which fits in the longitudinal groove so as to restrict the degree of freedom of rotation.

7. A wiper assembly configured to be used in cooperation with a wiper arm, comprising:
    a wiper; and
    the connector according to claim 1 that is configured to be detachably coupled between the wiper and the wiper arm.

* * * * *